United States Patent
Eisenhut et al.

(10) Patent No.: US 7,751,513 B2
(45) Date of Patent: Jul. 6, 2010

(54) SIGNAL PROCESSING METHOD, PARTICULARLY IN A RADIO-FREQUENCY RECEIVER, AND SIGNAL CONDITIONING CIRCUIT

(75) Inventors: Carsten Eisenhut, Mülheim a.d. Ruhr (DE); Jens Kissing, Bönen (DE); Giuseppe Li Puma, Bochum (DE); Dietolf Seippel, Bottrop (DE); Nenad Stevanovic, Bochum (DE)

(73) Assignee: Infineon Technologies AG, Munich (DE)

( * ) Notice: Subject to any disclaimer, the term of this patent is extended or adjusted under 35 U.S.C. 154(b) by 259 days.

(21) Appl. No.: 11/592,423

(22) Filed: Nov. 3, 2006

(65) Prior Publication Data

US 2007/0116160 A1 May 24, 2007

Related U.S. Application Data

(63) Continuation of application No. PCT/DE2005/000845, filed on May 4, 2005.

(30) Foreign Application Priority Data

May 4, 2004 (DE) .................. 10 2004 021 867

(51) Int. Cl.
*H04B 1/10* (2006.01)
(52) U.S. Cl. .................. 375/349; 375/316; 375/324; 375/340; 375/345
(58) Field of Classification Search .................. 375/349, 375/316, 324, 340, 345
See application file for complete search history.

(56) References Cited

U.S. PATENT DOCUMENTS

| 4,893,347 A | 1/1990 | Eastmond et al. |
| 6,009,317 A * | 12/1999 | Wynn .................. 455/296 |
| 6,608,527 B2 | 8/2003 | Moloudi et al. |
| 7,099,641 B2 * | 8/2006 | Bruckmann et al. ...... 455/232.1 |
| 7,317,894 B2 * | 1/2008 | Hirose .................. 455/3.02 |
| 2004/0156450 A1 * | 8/2004 | Auranen et al. .............. 375/324 |

FOREIGN PATENT DOCUMENTS

| DE | 43 19 256 C2 | 12/1994 |
| DE | 101 25 909 A1 | 12/2002 |
| DE | 101 31 457 A1 | 1/2003 |
| EP | 1 143 611 A1 | 10/2001 |
| WO | WO 03/092183 A2 | 11/2003 |

* cited by examiner

*Primary Examiner*—Ted M Wang
(74) *Attorney, Agent, or Firm*—Eschweiler & Associates, LLC

(57) ABSTRACT

A first signal path having an amplifier and a second signal path having an amplifier with adjustable gain factor are provided. A signal applied to the first and second signal paths is amplified and demodulated on the first signal path. Concurrently, the signal is amplified on the second signal path with a gain factor, and a power of the signal amplified by the second signal path is determined and used for determining the gain factor. A signal conditioning circuit has first and second signal paths and a first and a second operating state. In the first operating state, the first signal path is arranged for amplification for a demodulation, and the second signal path is arranged for amplification for determination of a power of the signal present. In the second operating state, one of the two signal paths is inactive and the other is arranged for demodulating the signal present.

15 Claims, 2 Drawing Sheets

SIGNAL PROCESSING METHOD, PARTICULARLY IN A RADIO-FREQUENCY RECEIVER, AND SIGNAL CONDITIONING CIRCUIT

REFERENCE TO RELATED APPLICATIONS

This application is a continuation of PCT/DE2005/000845 filed May 4, 2005 which was not published in English, that claims the benefit of the priority date of German Patent Application No. DE 10 2004 021 867.6, filed on May 4, 2004, the contents of which both are herein incorporated by reference in their entireties.

FIELD OF THE INVENTION

The invention relates to a method for signal processing, particularly in a receiver. The invention further relates to a signal conditioning circuit.

BACKGROUND OF THE INVENTION

Some modern communication standards have the capability of transmitting information with a variable data rate. One example of this is the Bluetooth communication standard. In this standard, various types of modulation are provided for transmitting various data rates. For a data transmission rate of 1 Mbit/s, frequency shift keying (GFSK modulation) is used as a type of modulation. For medium and high data transmission rates of 2 to 3 Mbit/s, a π/4 DQPSK and 8 DPSK modulation, respectively, are provided as types of modulation. Whereas in pure frequency shift keying, information is only transmitted over the time of a zero transition, an amplitude and a phase of the signal are changed simultaneously in the two π/4 DQPSK and 8 DPSK types of modulation which produces different requirements for a receiver.

FIG. 5 shows a typical block diagram of a receiver system for such a mobile communication standard. The received signal with a frequency $f_{RF}$ is amplified in a radio-frequency input stage 1 with a low-noise amplifier 12 and converted to an intermediate frequency $f_{IF}$ by means of a mixer 13. For this purpose, the mixer 13 uses a local oscillator signal with the frequency $f_{LO}$. The signal converted to the intermediate frequency $f_{IF}$ is supplied to a complex channel filter 2 which is arranged as a band-pass filter.

The filtered signal is amplified in a signal conditioning circuit 3 and digitized in a downstream analog/digital converter. In the signal conditioning circuit 3, the filtered signal is amplified up to a level which is suitable for the subsequent analog and digital signal processing. For example, the resolution of the downstream analog/digital converter is utilized by the gain set. The receiver path presented here contains a number of distributed amplifier stages having, in each case, individual gain factors which result in a common gain factor.

Depending on the mobile radio standard used, the gain factors in the individual stages are designed differently for optimum reception. For example, in the case of pure frequency modulation in which frequency shift keying is used, it is sufficient to work with limiting amplifier stages since there is no information contained in the signal amplitude. The amplifier stages can be operated, therefore, in limiting mode. Higher-valued modulation methods such as the π/4 DQPSK and 8 DPSK method described, however, also use amplitude and phase information. The amplification of a signal modulated with such a modulation method therefore requires a linear transfer characteristic of the amplifier stages.

To improve the signal/noise ratio of the received signal further, it is suitable to amplify the signal greatly, as far as possible before any complex signal processing. However, it is important to note that high input levels of a received signal are also amplified linearly so that any amplitude information which may be present is not corrupted. For this reason, modern communication systems use active control of the amplification in which, for example, the level of the input signal is determined and its amplification is adjusted in dependence thereon. The associated power measurement, called RSSI (radio signal strength indicator) measurement, allows active control.

A particular problem occurs with a mobile radio standard which changes the data rate/type of modulation variably during a transmission. Such an example is the new version of the Bluetooth mobile radio standard which operates in packet mode. In this mode, header and packet information, in particular, is first transmitted in data packets with a low GFSK data rate and GFS modulation and then the payload data are transmitted with the same or a medium or higher data rate with π/4 DQPSK or 8 DPSK modulation. It is thus necessary to determine the receive level of the received data packet and from this to suitably adjust the gain factor in dependence on the type of modulation of the payload data in order to prevent amplitude or phase errors.

Accordingly, a need exists for a simplified method for determining a suitable gain factor, as well as a corresponding signal conditioning circuit and method of use thereof.

SUMMARY OF THE INVENTION

The present invention overcomes the limitations of the prior art by providing a method for signal processing, and a signal conditioning circuit and method of using the signal conditioning circuit in a simple and efficient manner. Accordingly, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

In accordance with one aspect of the present invention a method and apparatus are provided, wherein a suitable gain factor is determined in a simple manner. According to the invention, a first signal path with an amplifier and a second signal path with an amplifier are provided. The amplifier of the second signal path has a controllable gain factor. A signal is applied to the first and second signal path, wherein the signal is amplified in the first signal path. Concurrently, the signal on the second signal path is amplified by the gain factor and a power of the signal applied to the second signal path is determined.

The power determined, for example, can be used for later adjustment of a gain factor. As a result, a demodulation and measurement of the signal level is advantageously carried out on two different signal paths. This is advantageous since errors during the demodulation, which can be caused by level measurement, are thus generally avoided. In particular, an optimum gain setting can be found and adjusted on the second signal path without demodulation errors occurring due to a settling process of the amplifier stages.

Demodulation, for example, is understood to be signal processing which generates digital values from the received signal. This can include, among other things, the conversion of the received signal into a baseband, and its separation into an in-phase component and a quadrature component.

In one embodiment, one of the two signal paths can also be switched off depending on information used as an identifier in the data content of the demodulated signal. The subsequent received signal can be amplified and processed further via the one signal path. This, for example, allows the current consumption of a circuit operating in accordance with this principle to be distinctly lowered because only the amplifier path needed for the amplification and the demodulation of the signal is active. Further, one of the two signal paths can thus be selected in dependence on the type of modulation. In addition, an amplifier on the first signal path can be arranged in a particularly simple and current-saving manner as a limiting amplifier having only a few stages via the present invention.

The method of the present invention can be used particularly advantageously for receiving signals with a variable data rate or type of modulation. The method, for example, can be utilized for receiving signals according to the Bluetooth mobile radio standard. In this context, a signal, such as a Bluetooth signal, is amplified with a gain factor on the second signal path and the power of the received signal is determined. On the first signal path, the signal is amplified and suitably demodulated at least partially during the demodulation process.

The determined power allows a suitable gain factor to be set for an optimum amplification at a later time of transmitted payload data in the signal, such as in the Bluetooth signal. Concurrently, information used as an identifier about the type of modulation of the signal used for the payload data can be obtained by the demodulation. In a Bluetooth signal, for example, information at the beginning of the signal is advantageously evaluated for this purpose. One of the two signal paths, for example, is switched off in dependence on the information obtained.

In a preferred embodiment, the power of a signal applied in the second signal path is determined by converting the signal into a value- and time-discrete signal. Subsequently, the amplitude of the converted signal is determined.

In accordance with another aspect of the invention, a signal conditioning circuit is provided, wherein the signal conditioning circuit comprises, apart from a first signal path with a first amplifier and a second signal path with a second amplifier with adjustable gain factor, a first and a second operating state which can be assumed. In the first operating state which can be assumed, the first signal path is arranged for amplifying a signal present and for providing the amplified signal for demodulation. In the first operating state which can be assumed, the second signal path is also arranged for amplifying the signal present and for determining a power of the signal present. In the second operating state which can be assumed by the signal conditioning circuit, either the first or the second signal path is arranged for amplifying the signal present and for demodulating the amplified signal. In this operating state, the other signal path is arranged for reducing a current or power consumption. In the second operating state which can be assumed, one of the two signal paths is suitably inactive, whereas the other signal path is arranged for amplifying and for providing the amplified signal in a suitable manner for demodulation.

According to one exemplary aspect, the signal conditioning circuit of the invention can be advantageously used for determining the level of a received signal, and the measured power can be delivered as radio signal strength indicator signal (RSSI) to other signal-processing circuits, such as the demodulation device. Due, at least in part, to the parallel amplification and provision for demodulation in the first operating state, it is possible to gain time for the settling of the individual amplifier stages, thus generally avoiding having to change the amplification during the reception of payload data and thus any possible loss of data.

In a preferred embodiment, the amplifier on the first signal path is arranged as a limiting amplifier. In another embodiment, the first signal path contains an analog/digital converter for the analog/digital conversion of a signal received and amplified via the first amplifier. For example, the analog/digital converter can be arranged as a $\Sigma\Delta$ (sigma delta) modulator.

In yet another embodiment of the invention, the second amplifier has an adjusting input for supplying a signal which adjusts the gain factor of the second amplifier. The second amplifier is thus arranged as an amplifier which can be programmed with its gain factor.

In accordance with another exemplary aspect of the invention, the signal conditioning circuit is arranged for receiving and for processing signals coded in accordance with the Bluetooth mobile radio standard. As an alternative, the signal conditioning circuit is arranged for processing signals having different types of modulation.

Thus, according to the invention, the first signal path can be arranged for receiving and demodulating payload data with low data rate and GFSK type of modulation, whereas the second signal path can be used for receiving payload data with a high data transmission rate. Thus, during the transmission of payload data in one example, only one path is ever activated. This reduces the current consumption and the power consumption. In addition, in the case of a data transmission with low data transmission rate, the first signal path is used, wherein the current consumption thereof is already reduced via the arrangement with a simple amplifier. Since the first signal path does not need to determine any data relating to the power of the signal present, it can be configured in a correspondingly simple manner. Further, the signal conditioning circuit can be arranged as an integrated circuit in a single semiconductor body.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
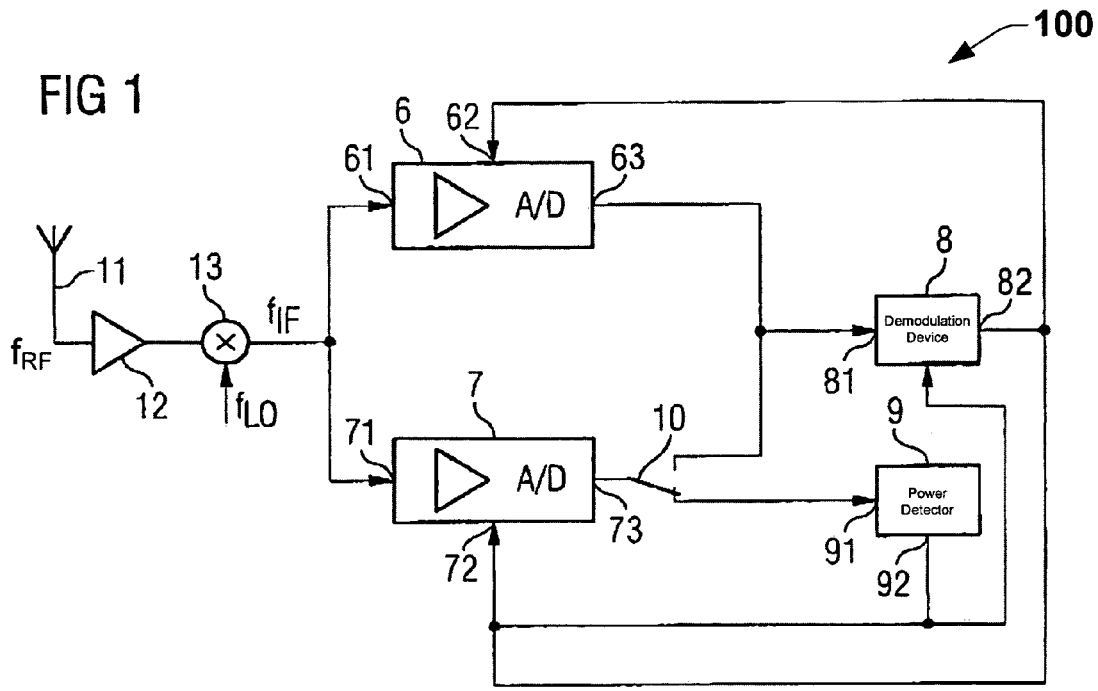
FIG. 1 illustrates a block diagram of a signal conditioning circuit in accordance with one aspect of the invention.

The present invention is directed generally to a method for signal processing, and a signal conditioning circuit and method of use thereof. Accordingly, the present invention will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

In accordance with one exemplary aspect of the invention, FIG. 1 illustrates the signal conditioning circuit 100 on a receiving path for Bluetooth signals. An antenna 11 is connected to the first input of a mixer 13 via a low-noise amplifier 12. Via the antenna 11, signals according to the Bluetooth mobile radio standard can be received at a frequency $f_{RF}$ which are converted to an intermediate frequency $f_{IF}$ with the aid of a local oscillator signal at the frequency $f_{LO}$ in the mixer 13.

The output of the mixer 13 is connected to an input 61 and 71 of a first signal path 6 and a second signal path 7, respectively. The two signal paths 6 and 7 can be individually activated or disconnected by a corresponding activation signal at their associated inputs 62 and 72. The signal paths 6 and 7 can thus both be active, both be disconnected, or one of them be active and the other be disconnected.

The two signal paths 6 and 7, for example, are arranged for amplifying a signal present at the respective inputs 62 and 72, and for analog/digital conversion and delivery of the amplified and digitized signal at respective outputs 63 and 73. For this purpose, for example, the signal paths 6 and 7 each comprise at least one amplifier and a analog/digital converter following the amplifiers.

The signal output 73 for the digital signal of the second signal path 7, for example, leads to an input of a switch 10. The switch 10 can assume one of at least two possible states, wherein, in a first switching state, the switch connects the output 73 to an input 91 of a power detector 9. In a second switching state, the switch 10 connects the output 73 of the second signal path 7 to the input 81 of a demodulation device 8. Furthermore, the output 63 of the first signal path 6 is also connected to the input 81 of the demodulation device 8.

The demodulation device 8 demodulates a digital signal present at its input 81 and generates, from this, the data coded in accordance with a type of modulation. Furthermore, the modulation device 8 controls the signal paths 6 and 7 via signals at an output 82. The modulation device 8, for example, can thus switch off one of the two signal paths 6 or 7.

The power detector 9 determines the level or the power from a signal present at its input 91. The corresponding measurement is also called RSSI measurement. The detector 9 has an output 92 which is connected to an adjusting input 93 of the modulation device 8 and input 72 of the second signal path 7. The signals delivered by the detector 9 can thus be used for adjusting the gain on the second signal path 7 and in the demodulation device 8. As a result, for example, the demodulation device is able to correct errors.

Figure 3:
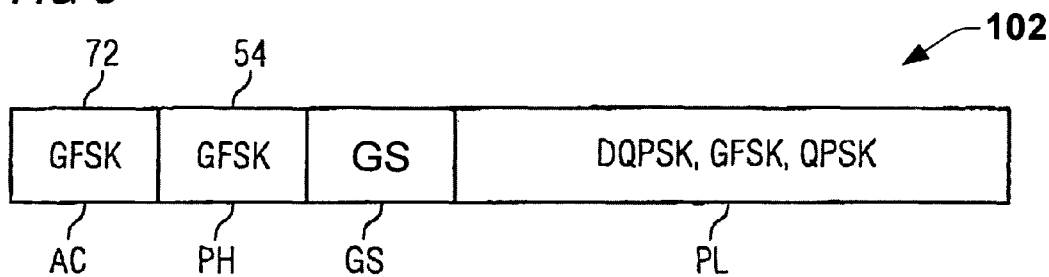
FIG. 3 illustrates a structural overview of a signal packet according to the Bluetooth mobile radio standard.

FIG. 3 illustrates a structure of a data packet 102 according to the Bluetooth mobile radio standard as is received by the signal conditioning circuit shown in FIG. 1 via its antenna 11. The precise specification of the standard is open and transparent. The data transmission rate can be increased via new extensions such as new types of modulation, as in the present case. However, the structure of the data packet 102 remains constant over all Bluetooth versions. The data packet 102 contains a preamble which, in turn, is subdivided into an access code AC, into packet information PH and a synchronization section GS. The preamble and the synchronization section, too, are modulated with a special frequency shift keying GFSK (Gaussian Frequency Shift Keying). The actual payload data PL are then transmitted with variable data rate and data length. The data rate is a result of a type of modulation. This differs and can change between GFSK, π/4 DQPSK and 8 DPSK per data packet. The type of modulation used for the payload data and the number of payload data is coded in the preamble. Within one data packet, the payload data uses the same type of modulation.

Figure 2:
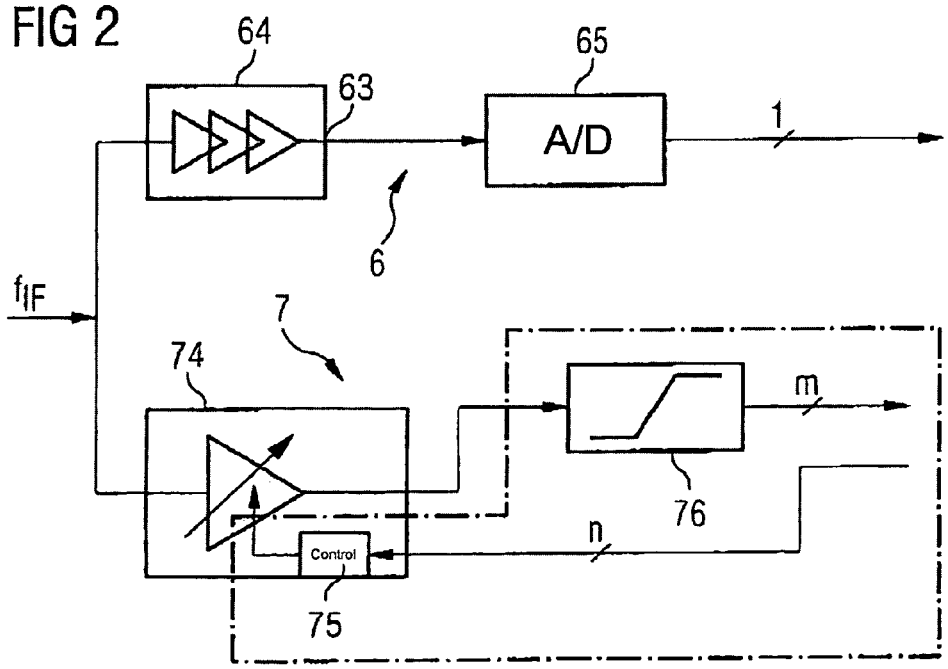
FIG. 2 illustrates a block diagram of a first and second signal path in accordance with another aspect of the invention.

FIG. 2 illustrates an exemplary embodiment of the first and second signal paths 6 and 7 of FIG. 1. Accordingly, components having like function carry like reference symbols. The present example comprises a limiting amplifier 64 and a linear, gain-programmable amplifier 74.

The limiting amplifier 64 is a part of the first signal path 6 and built up of a few stages in a simple manner. Evaluation or determination of RSSI data is carried out via the linear amplifier 74 which forms a part of the second signal path 7. The RSSI measurement is made at the beginning of a signal present in order to determine a suitable gain factor as quickly as possible. In the case of a Bluetooth signal, the RSSI measurement is carried out during the transmission of the preamble. Concurrently, the signal is demodulated.

For this purpose, the signal on the first signal path 6 is amplified by the amplifier 64 and supplied to an analog/digital converter 65. In the exemplary embodiment, the latter is arranged as a ΣΔ modulator and delivers a sequence of binary values at its output.

In the same manner, the second signal path 7 comprises an analog/digital converter 76 which, in the exemplary embodiment, delivers a parallel digital signal consisting of m bits at the output thereof. This is evaluated in the power detector 9 according to FIG. 1 which then determines the level of the signal. The power detector 9 of FIG. 1 is not shown in FIG. 2 for reasons of clarity, but controls the gain setting of the adjustable amplifier 74 via an n-bit-valued signal at a control circuit 75.

In the case of very high input levels, it may occur that the low-noise amplifier 12 at the antenna 11 of FIG. 1 already amplifies a received signal, and during this process is driven into limiting mode. As a result, the received signal is already overdriven and distorted. To prevent this case from occurring, it is possible to connect one or more evaluating circuits (not shown) directly following the mixer 13 or in parallel with the arrangement proposed here. The evaluating circuits can be arranged, for example, from simple comparators.

Accordingly, a rapid power estimation is performed and, if necessary, the gain of the low-noise amplifier 12 at the signal input is reduced to such an extent that the input signal is linearly amplified. The amplification via the input amplifier is taken into consideration in the RSSI measurement and the subsequent signal processing.

Parallel signal processing provides a particularly efficient method and simple implementation for adjusting the gain in a receiver chain. Further, the signal conditioning circuit according to the invention provides for the reception and demodulation of a radio-frequency signal. Due to the time gained in the parallel evaluation of the power measurement and the demodulation, amplifiers with greater settling times can also be used. Overall, it is thus possible to save power and area in the case of an integrated implementation.

Figure 4:
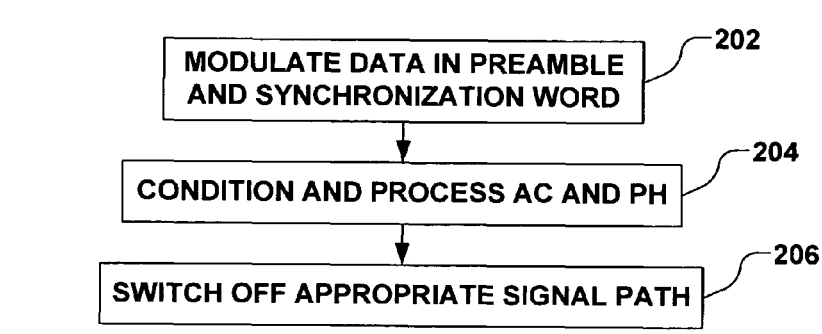
FIG. 4 illustrates an exemplary method for signal processing according to the present invention.
Figure 5:
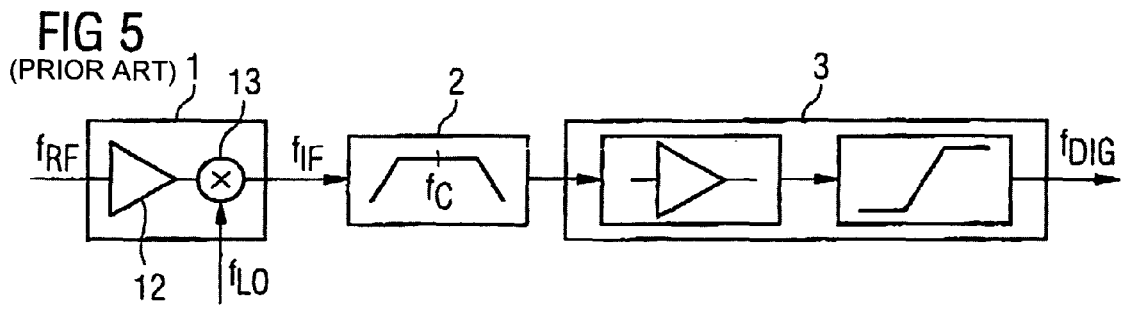
FIG. 5 illustrates a block diagram of a conventional receiving path.

FIG. 4 illustrates an exemplary embodiment of a method 200 for providing generally simultaneous signal processing of a Bluetooth signal during an RSSI measurement of the signal. In the present example, for purposes of illustration, the circuit 100 of FIG. 1 is used in the method 200, and the Bluetooth signal is structured as illustrated in FIG. 3. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

In accordance with the present invention, in act 202 of FIG. 4, both the first ting path and the second transmitting path are active during the reception of the preamble and of the synchronization section GS, wherein the data contained in the preamble and in the synchronization word are modulated with frequency shift keying. After conversion to the intermediate frequency $f_{IF}$ of FIG. 1, for example, these signals are supplied to the limiting signal path 6 and to the signal path 7 operating with linear amplification.

In act 204 of FIG. 4, the access code AC and the packet information PH of the preamble of FIG. 3 are conditioned and then processed further on the limiting path 6 of FIG. 1. In detail, the signal is amplified by a fixed factor. In the present example, it is of no significance whether the amplifier distorts the signal, since no information is coded in the amplitude of the preamble. Among other things, the preamble content indicates whether the subsequent payload data PL are transmitted with high or low data transmission rates and what type of modulation is needed for demodulation. For a low data transmission rate of 1 Mbit/s, for example, frequency shift keying FSK is used, a data transmission rate of 2 Mbit/s uses π/4 QPSK modulation, and the high data transmission rate of 3 Mbit/s is achieved with 8 DPSK modulation.

In the case of a low transmission rate and the frequency shift keying used therefor, for example, no amplitude information is needed for error-free demodulation of the payload data PL. A limiting amplifier of simple configuration is thus adequate for this data transmission rate. In the case of the mean or high data rate, the linearity should be taken into consideration during amplification in order to prevent data losses. Depending on the information about the data transmission rate contained in the preamble, either the first transmitting path 6 of FIG. 2 with the limiting amplifier 64 or the second transmitting path 7 with the linear amplifier 74 is thus selected for receiving the payload data.

In act 204 of the method 200 of FIG. 4, for example, the received power is further concurrently determined in parallel via the second signal path 7 with the linear amplifier 74 of FIG. 2. In the present example, it is assumed that the average received power remains approximately constant even during the payload data signal. The level of the input signal determined provides a gain factor wherein sufficiently good signal quality can be achieved with good linearity characteristics. The input power of the signal, for example, is determined at the lowest amplification of the linear amplifier 74 and on the second signal path 7. This generally ensures linear amplification, wherein at high input levels, crosstalk and generation of intermodulation products is generally prevented.

The amplification of the linear amplifier 74 on the second signal path 7 can be suitably raised step by step. The optimum amplification, for example, is achieved when the entire resolution of the analog/digital converter 76 following the amplifier 74 is utilized. Using the parallel signal processing, error-free demodulation of the preamble can be carried out with simultaneous or concurrent determination of the input level of the Bluetooth signal.

In act 206 of FIG. 4, the signal path not used is switched off for the reception of payload data. Accordingly, current is saved, while optimum amplification of the received signal is further possible.

Using the parallel signal paths reduces the average current consumption since linear amplifiers needed for the higher transmission rates consume more power than a limiting amplifier of simple configuration. At low transmission rates, a simple current-saving amplifier is of advantage and the linear amplifier is inactive. However, the linear amplifier can be further used for the RSSI measurement which saves additional components for an RSSI measurement in the limiting amplifier.

Accordingly, the present invention provides a method for signal processing, and a signal conditioning circuit and method of using the signal conditioning circuit in a simple and efficient manner. It should be noted that although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method for signal processing in a receiver, the method comprising:

providing a first signal path and a second signal path, wherein the first signal path comprises a first amplifier, and wherein the second signal path comprises a second amplifier having a controllable gain factor;

applying a signal to the first and second signal paths, wherein the signal applied to the first and second signal paths is the same signal;

amplifying the signal on the first signal path, therein defining a first amplified signal, and demodulating the first amplified signal to generate digital values associated with the amplified signal;

amplifying the signal on the second signal path based on an initial gain factor, therein defining a second amplified signal;

digitizing the second amplified signal, therein defining a digitized signal having an amplitude associated therewith;

determining a power of the signal applied to the second signal path based on the amplitude of the digitized signal; and controlling the gain factor of the second amplifier based on the determined power; and wherein an amplitude of the signal is evaluated prior to being applied to the first and second signal paths, and wherein the signal is associated with the initial gain factor, or wherein the initial gain factor is associated with a lowest limit of amplification associated with the second amplifier, or wherein demodulating the first amplified signal comprises determining an identifier in a data content of the signal applied to the first signal path, wherein the identifier is associated with a type of modulation, or wherein applying the signal to the first and second signal paths comprises applying a pulsed signal with a data content, wherein the pulsed signal has at least two different types of modulation, or wherein applying the signal to the first and second signal paths comprises applying a pulsed signal with a data content, wherein the pulsed signal is conditioned in accordance with the Bluetooth mobile radio standard.

2. The method of claim 1, wherein the demodulation of the first amplified signal and the determination of the power of the signal applied on the second signal path occur at least partially at the same time.

3. The method of claim 1, wherein when demodulating the first amplified signal comprises determining an identifier in a data content of the signal applied to the first signal path, wherein the identifier is associated with a type of modulation, further comprising switching off the first signal path or the second signal path based on the determined identifier.

4. The method of claim 1, wherein amplifying the signal on the first signal path comprises amplifying the signal on the first signal path with a fixed gain factor.

5. A signal conditioning circuit configured to operate in a first operating state and a second operating state, the signal conditioning circuit comprising:

a first signal path comprising a first amplifier, a first control input, and a first signal output;

a second signal path connected in parallel with the first signal path, the second signal path comprising a second amplifier, a first control input, a second signal output, a switch coupled to the second signal output, and a power detector, wherein the second amplifier has an adjustable gain factor; and a demodulation device connected in series with the first signal path and the second signal path, wherein in a first operating state, the first signal path is configured to amplify a present signal via the first amplifier, therein defining a first amplified signal, and wherein the demodulator is configured to demodulate the first amplified signal, and wherein the second signal path is configured to amplify the present signal via the second amplifier, therein defining a second amplified signal, and wherein the power detector is configured to determine a power of the present signal based on a position of the switch, wherein the gain factor of the second amplifier is controlled based on the determined power of the present signal, and wherein in a second operating state, one of the first signal path or the second signal path is configured for amplifying the present signal and for providing the respective first or second amplified signal to the demodulation device, and the other respective first or second signal path is deactivated for reducing power consumption associated therewith, based on the first control input and the second control input to the respective first and second signal paths.

6. The signal conditioning circuit of claim 5, wherein the first amplifier comprises a limiting amplifier.

7. The signal conditioning circuit of claim 5, wherein the first signal path comprises a first analog/digital converter connected in series after the first amplifier, wherein the first analog/digital converter is configured to provide a value-discrete signal.

8. The signal conditioning circuit of claim 5, wherein the second signal path comprises a second analog/digital converter connected in series after second amplifier, wherein the second analog/digital converter is configured to provide a digital value comprising a number of bits.

9. The signal conditioning circuit of claim 5, wherein the first signal output of the first signal path is coupled to an input of the demodulation device.

10. The signal conditioning circuit of claim 5, wherein the second signal output of the second signal path is selectively coupled to an input of the demodulation device, based on the position of the switch.

11. The signal conditioning circuit of claim 5, wherein the first and second control inputs of the respective first and second signal paths are connected to a control signal output of the demodulation device.

12. The signal conditioning circuit of claim 11, wherein the demodulation device is configured to determine a type of modulation that is coded in the present signal and for delivering the control signal output to the first and second control signal inputs based on the determined type of modulation.

13. The signal conditioning circuit of claim 5, wherein the switch selectively connects the second signal output of the second signal path to the power detector or the demodulation device.

14. The signal conditioning circuit of claim 5, wherein the power detector is configured for RSSI measurement.

15. The signal conditioning circuit of claim 5, wherein the present signal is associated with the Bluetooth mobile radio standard, wherein one of the first signal path or the second signal path is selected based on a data content of the present signal, and wherein power consumption of the other of the first or second signal paths is reduced.

* * * * *